Patented Oct. 3, 1922.

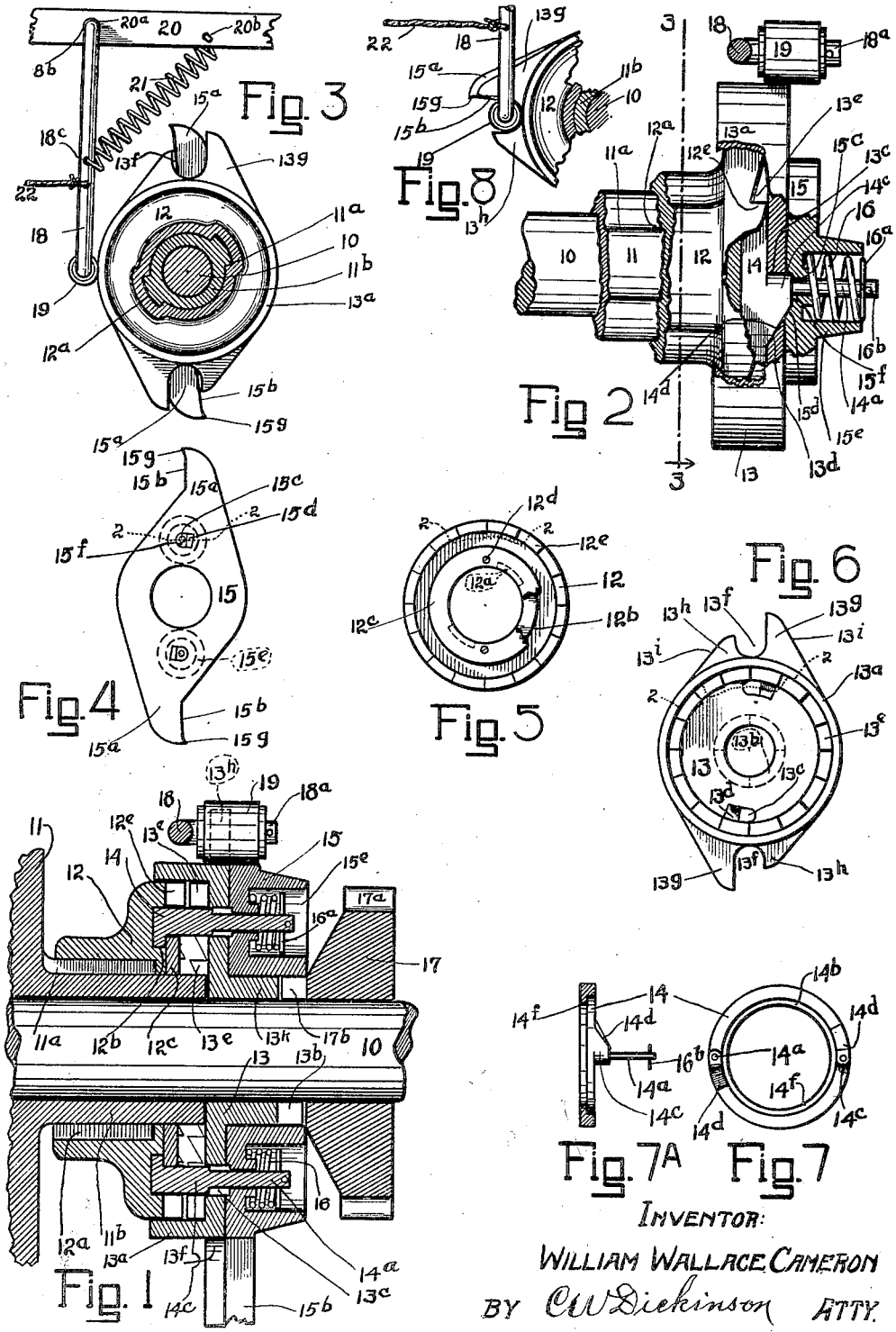

1,430,722

UNITED STATES PATENT OFFICE.

WILLIAM WALLACE CAMERON, OF LA CROSSE, WISCONSIN, ASSIGNOR TO LA CROSSE PLOW COMPANY, OF LA CROSSE, WISCONSIN.

CLUTCH.

Application filed February 5, 1919. Serial No. 275,169.

*To all whom it may concern:*

Be it known that I, WILLIAM WALLACE CAMERON, a citizen of the United States of America, whose residence is 1008 Rose Street, in the city of La Crosse, county of La Crosse, State of Wisconsin, have invented certain new and useful Improvements in Clutches, of which the following is a true specification, reference being had to the accompanying drawings, which are made a part hereof.

The invention has reference to clutches.

The object of the invention is to produce a clutch that has improved means for engaging and disengaging the members thereof, and that may be very compactly built, be very simple in construction, and easy to throw into and out of gear. This clutch is found illustrated in use in my copending application filed Feb. 5, 1919, S. 275170, grain drills.

In the drawings, Fig. 1 is a horizontal sectional view, taken along the axial line; Fig. 2 is a plan view, with parts broken away to show interior construction; Fig. 3 is a cross sectional elevation taken on line 3—3 of Fig. 2; Fig. 4 is a side view of a detail, on a smaller scale, of a part for operating and controlling the shifting mechanism that throws the clutch members into and out of gear; Fig. 5 is an inner side view in elevation of the driving clutch member; Fig. 6 is an inner side view in elevation of the driven clutch member; Fig. 7 is an end view of the shifter enclosed between the members for putting the members into and out of gear, looking toward the driving member; Fig. 7A is a sectional elevation of the shifter; Fig. 8 is a view of the parts shown in Fig. 3 when they have rotated far enough to be locked by the roller.

In the drawings, the numeral 10 indicates a shaft upon which a portion of the clutch parts are placed, mounted in a wheel 11 having an extended hub portion $11^b$. The member $11^b$ rotates to communicate movement to the clutch members. Opposed keys or bosses $11^a$ are formed on the portion $11^b$ of the wheel. Slidingly mounted on the hub portion $11^b$ is a clutch member 12, having opposed longitudinal recesses $12^a$—$12^a$ for the reception of the keys $11^a$—$11^a$, the fit between the keys and key-ways being loose to permit of lateral sliding of the member 12 with respect to the hub. $12^b$ indicates an annular groove formed in the inner face of the web of the member 12, radially spaced within the diametrical extremity of the member; $12^c$ is a ring secured to the inner face of the member adjacent the shaft 10 and projecting diametrically somewhat beyond the inner wall of the groove $12^b$, and secured to the member 12 by screws $12^d$. Formed on the inner wall of the member beyond the annular groove $12^b$ is an annular series of clutch teeth, $12^e$, projecting inwardly toward the teeth of the driven member.

Rotatively mounted on the shaft 10 is a driven clutch member, 13 having a hub portion $13^k$ on the outer face of its web, by which it is mounted on the shaft and a flange $13^a$ on its periphery that extends laterally as a protecting casing over the clutch teeth. Formed on the outer end of the hub $13^k$ is an annular series of clutch teeth $13^b$ kept constantly in mesh with the teeth $17^b$ of a member 17 also mounted on the shaft 10, the member 17 having circumferential teeth $17^a$ suitable for driving purposes. The member 17 is operatively a portion of the member 13; but these members are made in separate pieces to permit of the placing in position of another member 15 which is rotatively mounted on the hub $13^k$, the orifice in the member 15 being smaller than the outer diameter of the member 17. The member 17 may be used to rotate the shaft 10, in which case it should be secured to the shaft 10; but if it be desired to drive only by means of the teeth $17^a$ it may be loose on the shaft.

Piercing the web of the member 13 are opposed holes, $13^c$ having one of its walls bevelled to form cams $13^d$—$13^d$, the cams extending from side to side of the web and being curved concentrically with the axis of the member, as shown in Fig. 6. Formed on the inner surface of the member radially beyond the openings $13^c$ is an annular series of clutch teeth $13^e$, adapted to mesh with the teeth $12^e$. Extending diametrically beyond the flange $13^a$ are opposed pairs of prongs $13^g$—$13^h$, the prongs $13^g$ being longer than the prongs $13^h$, and having between them the openings $13^f$ and having outer tangential slopes $13^i$—$13^i$; the prongs are transversely aligned with the web of the member 13.

Rotatively seated within the annular groove $12^b$ is a disc 14 having a concentric annular opening $14^b$, partially closed by the inwardly projecting flange $14^f$, this flange fitting beneath the over reaching portion of the ring $12^c$, whereby the disc may be rotatively and longitudinally secured to the driving member 12. Protruding laterally from the face of the disc toward and into the openings $13^c$ are lugs $14^c$ having cams $14^d$ adapted to slidingly engage with the cams $13^d$. The thickness of the lugs is somewhat greater than that of the web of the member 13. Extending from each of the lugs $14^c$ and reaching through and beyond the web of the member 13 are posts $14^a$.

Adjacent the outer face of the web of the member 13 and having holes $15^c$ aligned with the holes $13^c$ is a plate 15 having in its adjacent face depressions $15^f$ adapted to receive the outer ends of the lugs $14^c$, one of its walls being bevelled to form a cam surface $15^d$ coinciding with the cam $14^d$, as shown in Fig. 2. By means of the holes $15^c$ the member 15 is placed upon the posts $14^a$, so that the inner face of the member 15 and the outer face of the member 13 adjoin, as shown in Fig. 2. Surrounding the posts $14^a$ within housing $15^e$ on the member 15 which is a support for the springs, are coiled springs 16, kept under tension thereon by the washers and pins $16^a$ and $16^b$, as shown in Figs. 1 and 2, the tension being greatest when the clutch members are disengaged, and lighter when they are engaged, it requiring less force to hold them engaged than to force them into engagement.

The member 15 has diametrically opposed arms $15^a$, having radial cam faces $15^b$, as shown in Fig. 4, the outer ends of the arms being slightly upturned somewhat in hook form $15^g$.

Hung from a bar 20, which may be any convenient part of a structure on which the clutch is used, in an opening $20^a$, is a link 18 having a hook portion $18^b$ in said opening with its lower end provided with a roller, 19; extending between the link, at $18^c$ and the support 20 at $20^b$, is a spring, 21, having sufficient tension to hold the roller against the periphery of the member 13 when the members are engaged, as shown in Fig. 3, and to force the roller into the opening $13^f$, as shown in Fig. 8, when the members are disengaged, at which time the force of the movement has shifted the member 15 rotatively so that the arm $15^a$ is substantially aligned with the prong $13^g$ so as not to prevent the passage of the roller into the opening $13^f$. Secured to the link 18 at any convenient place is a cord 22, which is extended to any suitable place to be within reach of an operator.

In the position of the clutch members and the roller as indicated in Fig. 3, the clutch teeth are in mesh, as shown in the broken away portion of Fig. 2, and the cam $14^d$ is in engagement with the cam $13^d$—$15^d$, the ends of the lugs $14^c$ then being seated in the depressions $15^f$, the springs 16 being expanded to their least tension, having drawn the posts $14^a$ and the disc 14 outwardly. In this position the members 12—13—14—15 rotate as a unit, the member 13 driving the member 17 by means of the teeth $13^b$—$17^b$. The parts will continue to rotate as a unit until they have made nearly a quarter further turn, by which time the arm $15^a$ will come into contact with the roller 19 and arrest the progress of the whole member 15; and inasmuch as the posts $14^a$ protrude through the holes $15^c$, the posts and the disc 14, with its cams $14^d$ will also be arrested, and as the cams $14^d$ are then standing still and the cams $13^d$ are still in movement, the effect will be to force the cams $14^d$ and the ring 14 backwardly, against the force of the springs 16, until the clutch teeth $13^c$ and $12^c$ are disengaged. From the position of the lugs $14^c$ as shown in Fig. 1 it will be seen that when the teeth are disengaged the cam surfaces $13^d$ and $14^d$ are still in engagement, because of the greater thickness of the lugs than the web of the member 13. The continued rotation of the arms $13^g$ and $13^h$ after the arm $15^a$ has been arrested by the roller has the effect of clearing the opening $13^f$ so that the force of the spring 21 will easily cause the roller 19 to enter the opening and be seated between the prongs $13^g$ and $13^h$ on that side of the member 13 that has then reached the roller, effectually preventing any further rotation of the parts, and with the clutch teeth out of mesh and the springs 16 under their greatest tension, as shown in Fig. 1.

If, when the members are disengaged, as shown in Fig. 1, it is desired to put the clutch members into mesh, the operator pulls forwardly on the cord 22, which will remove the roller from the opening $13^f$, whereupon the force of the tensioned springs 16 will be free to pull the member 14 outwardly again, thereby pulling the driving member 12 outwardly until the clutch teeth $12^c$ and $13^c$ are again engaged, whereupon, because the lugs $14^c$ with their cammed portions are within the openings $13^c$—$13^c$ and the posts $14^a$ are within the openings in the plate 15, the members 14, 13 and 15 will be caused to rotate with the member 12 until the opposite arm $15^a$ has made a half revolution and comes into contact with the roller 19, to again arrest the movement of the parts 14—15, which will again permit the member 13 to operate the cams $13^d$ against the cams $14^d$, and again cause the disc 14 to crowd the driving member 12 backwardly until the clutch teeth are disengaged, and the roller 19 is in the opposite opening $13^f$ and it is locked against movement.

It will be noted that when the clutch members are engaged, as shown in Fig. 2, the disc 14 is stationary with respect to the member 12 and rotates with it; but when the members are disengaged and the member 14 is locked in rotatively stationary position, the member 12 rotates about the disc that is within the groove 12$^b$. The members 13—14—15 make a half revolution in the process of being driven by the member 12, but the process of engaging and disengaging the clutch teeth is very quick. It will be observed that when the arm 15$^a$ rests against the roller, the member 14 is locked against further movement, and that the cams of the member 13 operate against the cams of the member 14 until the clutch teeth are separated, and that when the roller has entered the opening 13$^f$ the members 13—14—15 are all locked against further movement until the roller is released from its locking place by the pulling of the cord 22. In Fig. 1 the roller is represented as being in the position the parts assume when the arm 15$^a$ and the member 13 have gone one quarter further around than is shown in Fig. 3, the prong 13$^h$ being shown in dotted lines, and arm 15$^a$ and prong 13$^g$ not being visible in this figure.

Having now described my invention, what I claim is:

1. In a clutch, the combination of a driving and a driven member, and an element enclosed between the two members and affixed to the interior wall of one and longitudinally engaging the interior wall of the other and mechanism for shifting the element to engage and disengage the members, said mechanism being connected to the element and having circumferential movement to shift the same, and located adjacent the exterior wall of one of the members.

2. In a clutch, the combination of a driving and a driven member having webs, one of which has an opening with a cam formed on an edge thereof, an element enclosed between the webs and longitudinally affixed to one of them and having a cam coacting with the cam of the opposite member, a portion of the element projecting outwardly beyond the web of the member having the cam, and means secured to the projection for laterally shifting the element to engage and disengage the members.

3. In a clutch, the combination of a driving and a driven member having webs one of which has an opening therethrough and a cam formed on one edge of the opening, a shifting element enclosed between the webs in fixed longitudinal relation with one of them and having a cam adapted to coact with the cam in the opening, a portion of the element extending outwardly beyond the cammed web, mechanism secured to the projecting portion for laterally shifting the same to engage and disengage the members, and a lock for the mechanism adapted to hold the members in their adjusted relations.

4. In a clutch, the combination of a driving member having a portion towards its circumference adapted to engage a driven member and an annular groove formed in its web radially within the engaging portion, a driven member having a portion towards its circumference adapted to operatively engage the driving member and having an opening through its web radially within the engaging portion with one of its edges cammed, a disc rotatively seated within the groove and having a cam adapted to coact with the cam in the opening and a portion thereof projecting beyond the web, means for securing the disc within the groove, mechanism adjoining the cammed web secured to the projecting portion of the disc for laterally shifting the cams to engage and disengage the members, and a lock for the mechanism adapted to hold the cams in adjusted relations to secure the members in engaged and disengaged relations, the disc and the mechanism revolving with the driven member when the members are engaged, and remaining stationary with the driven member when the members are disengaged.

5. In a clutch, the combination of a laterally shiftable driving member, a laterally fixed driven member having an opening through its web, and means for shifting the driving member into engagement with the driven member comprising an element secured between the webs of the members longitudinally affixed to the driving member and having circumferential movement with respect to the same and having a post extending through the opening, a spring supporting member, and a spring connection between the support and the post.

6. In a clutch, the combination of a laterally shiftable driving member and a laterally fixed driven member having an opening through its web, means for shifting the driving member into engagement with the driven member comprising an element secured between the webs of the members longitudinally fixed to the driving member and having a post extending through the opening, a rotatable spring support adjoining the post and a spring connection between the post and the support, and means for locking the support to hold the members out of engagement.

WILLIAM WALLACE CAMERON.